United States Patent
Foley et al.

(10) Patent No.: US 10,649,702 B2
(45) Date of Patent: *May 12, 2020

(54) COMMUNICATION BETWEEN AN IMAGE FORMING DEVICE AND A REPLACEABLE SUPPLY ITEM

(71) Applicant: LEXMARK INTERNATIONAL, INC., Lexington, KY (US)

(72) Inventors: Nathan Wayne Foley, Lexington, KY (US); Jennifer Topmiller Williams, Lexington, KY (US); Gregory Scott Woods, Lexington, KY (US); Jimmy Daniel Moore, Jr., Georgetown, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,623

(22) Filed: Apr. 12, 2018

(65) Prior Publication Data

US 2019/0317707 A1 Oct. 17, 2019

(51) Int. Cl.
*G06F 3/12* (2006.01)
*G06F 3/06* (2006.01)
(Continued)

(52) U.S. Cl.
CPC ............ *G06F 3/1235* (2013.01); *G06F 3/061* (2013.01); *G06F 3/0659* (2013.01);
(Continued)

(58) Field of Classification Search
None
See application file for complete search history.

(56) References Cited

U.S. PATENT DOCUMENTS 5,224,157 A * 6/1993 Yamada ................ H04M 11/00
379/100.05
6,307,779 B1 10/2001 Roohparvar
(Continued)

FOREIGN PATENT DOCUMENTS

CN 105398225 B 7/2014
CN 105398225 A 3/2016
(Continued)

OTHER PUBLICATIONS

U.S. Appl. No. 15/951,586, filed Apr. 12, 2018 (Foley et al.).
(Continued)

*Primary Examiner* — Hyun Nam
(74) *Attorney, Agent, or Firm* — Wendell W. Harris

(57) ABSTRACT

A toner container installable in an image forming device having a controller according to one example embodiment includes a housing having a reservoir for storing toner. A chip is positioned on the housing and configured to, after sending a first busy response to the controller of the image forming device, receive a second write command from the controller of the image forming device that is abbreviated relative to a first write command received from the controller of the image forming device and that requests the chip to send a response to the first write command. The chip is further configured to send a response to the first write command to the controller of the image forming device if upon receiving a read command corresponding to the second write command the chip has completed processing the first write command.

6 Claims, 4 Drawing Sheets

(51) Int. Cl.
*G06F 13/16* (2006.01)
*G06F 13/40* (2006.01)

(52) U.S. Cl.
CPC ............ *G06F 3/0673* (2013.01); *G06F 3/122* (2013.01); *G06F 13/1668* (2013.01); *G06F 13/4068* (2013.01); *G06F 2213/0016* (2013.01)

(56) References Cited

U.S. PATENT DOCUMENTS

| | | | |
|---|---|---|---|
| 6,819,444 B1* | 11/2004 | Yamagishi | H04N 1/00278 |
| | | | 1/278 |
| 7,426,613 B2 | 9/2008 | Booth et al. | |
| 7,930,162 B1 | 4/2011 | Chan | |
| 8,225,021 B2 | 7/2012 | Adkins et al. | |
| 8,521,970 B2 | 8/2013 | Booth | |
| 8,621,116 B2 | 12/2013 | Fister et al. | |
| 2002/0076225 A1* | 6/2002 | Kurz | B41J 2/17566 |
| | | | 399/12 |
| 2003/0185032 A1 | 10/2003 | Zagorianakos | |
| 2005/0120260 A1 | 6/2005 | Suzuki | |
| 2006/0123085 A1* | 6/2006 | Burns | H04L 51/38 |
| | | | 709/206 |
| 2007/0038872 A1* | 2/2007 | Bridges | G06F 21/608 |
| | | | 713/193 |
| 2007/0077074 A1 | 4/2007 | Adkins | |
| 2007/0250659 A1 | 10/2007 | Booth | |
| 2007/0258723 A1* | 11/2007 | Nakazato | G03G 15/55 |
| | | | 399/9 |
| 2009/0285594 A1 | 11/2009 | Kichise | |
| 2010/0194920 A1* | 8/2010 | Gai | H04N 1/00132 |
| | | | 348/231.2 |
| 2011/0018951 A1* | 1/2011 | Muraki | B41J 2/355 |
| | | | 347/192 |
| 2014/0032801 A1 | 1/2014 | Nixon et al. | |
| 2014/0082234 A1 | 3/2014 | Gopalakrishnan et al. | |
| 2014/0085665 A1* | 3/2014 | Sheldon | G06Q 10/0631 |
| | | | 358/1.15 |
| 2014/0169803 A1* | 6/2014 | Lee | G03G 15/0863 |
| | | | 399/12 |
| 2016/0042257 A1* | 2/2016 | Kim | G06K 15/181 |
| | | | 358/1.15 |
| 2017/0060806 A1 | 3/2017 | Kudekar | |

FOREIGN PATENT DOCUMENTS

| | | |
|---|---|---|
| CN | 106739533 B | 6/2018 |
| JP | 2007055024 A | 3/2007 |
| JP | 2008261994 A | 10/2008 |
| WO | 01/06444 A1 | 1/2001 |

OTHER PUBLICATIONS

U.S. Appl. No. 15/951,604, filed Apr. 12, 2018 (Foley et al.).
English translation; JP20190748923 application Office Action; dated Aug. 20, 2019.
English translation; KR10-2019-0042476 application office action, dated Jul. 22, 2019.
International Search Report; PCT/US2019/026086 application, dated Jun. 18, 2019.
Extended European search report, dated Nov. 29, 2019. EP19168438.0.
Axelson, Jan; "USB Complete: The Developer's Guide". Jun. 1, 2009 (Jun. 1, 2009), Lakeview Research LLC, Madison, WI, US, XP055355656, ISBN: 978-1-931448-08-6; pp. 1-529.
Aghdaie, N., et al; "Client-Transparent Fault-Tolerant Web Service", Conference proceedings of the 2001 IEEE International Performance, Computing, and Communications Conference (IPCCC). Phoenix, AZ, Apr. 4-6, 2001; [IEEE International Performance, Computing and Communications Conference], New York, NY: IEEE, US, Apr. 4, 2001 (Apr. 4, 2001), pp. 209-216, XP001049954, DOI: 10.1109/IPCCC.2001.918654 ISBN: 978-0-7803-7001-2.

* cited by examiner

COMMUNICATION BETWEEN AN IMAGE FORMING DEVICE AND A REPLACEABLE SUPPLY ITEM

CROSS REFERENCES TO RELATED APPLICATIONS

None.

BACKGROUND

1. Field of the Disclosure

The present disclosure relates generally to image forming devices and more particularly to communication between an image forming device and a replaceable supply item.

2. Description of the Related Art

An electrophotographic image forming device typically includes one or more customer replaceable supply items that have a shorter lifespan than the image forming device. For example, the image forming device may include replaceable supply items that replenish the image forming device's toner supply and/or that replace worn imaging components, such as the photoconductive drum, fuser, etc. It is desired for the image forming device and the supply items to communicate information with each other for proper operation. For example, it may be desired to communicate such information as authentication or validation information, consumption or usage rates, replacement schedules, etc. Each supply item typically includes a chip configured to communicate with and respond to commands from a controller in the image forming device. Efficient communication between the controller of the image forming device and the chips of the supply items is desired.

SUMMARY

A toner container installable in an image forming device having a controller according to one example embodiment includes a housing having a reservoir for storing toner. A chip is positioned on the housing and configured to receive a first write command from the controller of the image forming device. The chip is further configured to send a first busy response to the controller of the image forming device upon receiving a first read command from the controller of the image forming device corresponding to the first write command while processing the first write command. The chip is further configured to, after sending the first busy response, receive a second write command from the controller of the image forming device that is abbreviated relative to the first write command and that requests the chip to send a response to the first write command. The chip is further configured to send a response to the first write command to the controller of the image forming device if upon receiving a second read command corresponding to the second write command the chip has completed processing the first write command. The chip is further configured to send a second busy response to the controller of the image forming device if upon receiving the second read command the chip has not completed processing the first write command.

A chip configured for communication with a controller of an image forming device and mountable on a replaceable supply item for installation in the image forming device according to one example embodiment includes a processor and a memory. The memory stores program instructions for execution by the processor including instructions to receive a first write command from the controller of the image forming device, to send a first busy response to the controller of the image forming device upon receiving a first read command from the controller of the image forming device corresponding to the first write command while processing the first write command, to, after sending the first busy response, receive a second write command from the controller of the image forming device that is abbreviated relative to the first write command and that requests the chip to send a response to the first write command, to send a response to the first write command to the controller of the image forming device if upon receiving a second read command corresponding to the second write command the processor has completed processing the first write command, and to send a second busy response to the controller of the image forming device if upon receiving the second read command the processor has not completed processing the first write command.

A chip for use on a replaceable supply item of an image forming device according to one example embodiment includes processing circuitry configured to communicate as a slave node of an I2C communication bus with a controller of the image forming device as a master node of the I2C communication bus. The processing circuitry is configured to, after sending a first busy response to the controller of the image forming device while processing a first write command received from the controller of the image forming device, receive a second write command from the controller of the image forming device that has less data than the first write command and that requests the chip on the replaceable supply item to send a response to the first write command. The processing circuitry is configured to send a response to the first write command to the controller of the image forming device if upon receiving a read command corresponding to the second write command the processing circuitry is no longer processing the first write command.

A method of processing commands from a controller of an image forming device by a chip on a replaceable supply item installed in the image forming device according to one example embodiment includes after sending a first busy response by the chip on the replaceable supply item to the controller of the image forming device while processing a first write command received by the chip on the replaceable supply item from the controller of the image forming device, receiving a second write command by the chip on the replaceable supply item from the controller of the image forming device that has less data than the first write command and that requests the chip on the replaceable supply item to send a response to the first write command. If upon receiving a read command corresponding to the second write command the chip on the replaceable supply item is no longer processing the first write command, a response to the first write command is sent by the chip on the replaceable supply item to the controller of the image forming device.

A method of electrical communication between a slave node of an I2C communication bus positioned on a replaceable supply item installed in an image forming device and a controller of the image forming device as a master node of the I2C communication bus according to one example embodiment includes receiving a first write command by the slave node on the replaceable supply item from the controller of the image forming device. Upon receiving a first read command by the slave node on the replaceable supply item from the controller of the image forming device corresponding to the first write command while processing the first write command, a first busy response is sent by the slave node on the replaceable supply item to the controller of the image forming device. After sending the first busy response, a second write command is received by the slave node on the replaceable supply item from the controller of the image forming device that is abbreviated relative to the first write command and that requests the slave node on the replaceable supply item to send a response to the first write command. If upon receiving a second read command corresponding to the second write command the slave node on the replaceable supply item has completed processing the first write command, a response to the first write command is sent by the slave node on the replaceable supply item to the controller of the image forming device. Otherwise, a second busy response is sent by the slave node on the replaceable supply item to the controller of the image forming device.

A method of facilitating electrical communication between a controller of an image forming device and a chip for use on a replaceable supply item of the image forming device according to one example embodiment includes configuring the chip to operate as a slave node on an I2C communication bus where the controller of the image forming device serves as a master node on the I2C communication bus. The chip is configured to receive a first write command from the controller of the image forming device, to send a first busy response to the controller of the image forming device upon receiving a first read command from the controller of the image forming device corresponding to the first write command while processing the first write command, to, after sending the first busy response, receive a second write command from the controller of the image forming device that is abbreviated relative to the first write command and that requests the chip to send a response to the first write command, to send a response to the first write command to the controller of the image forming device if upon receiving a second read command corresponding to the second write command the chip has completed processing the first write command, and to send a second busy response to the controller of the image forming device if upon receiving the second read command the chip has not completed processing the first write command.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
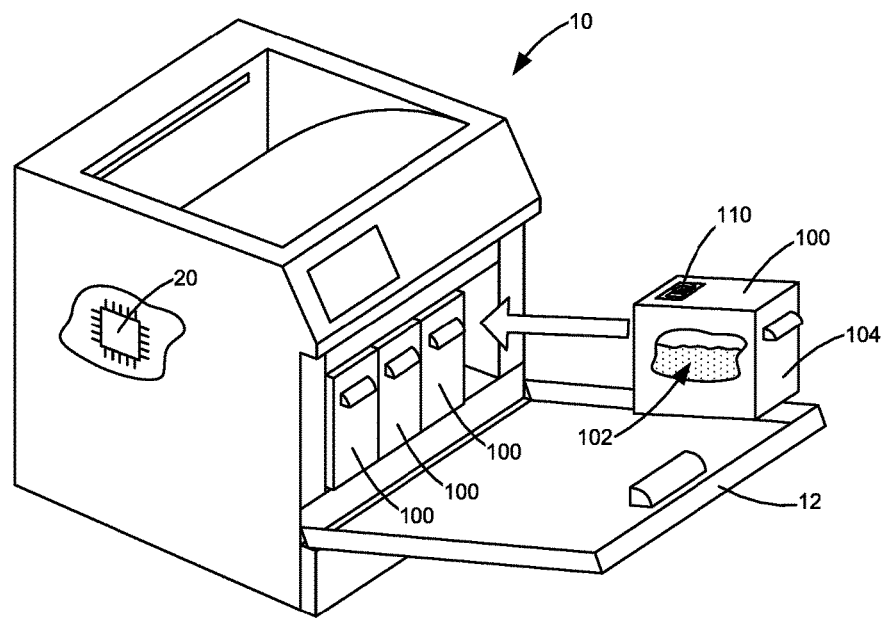
FIG. 1 is a schematic view of an image forming device having one or more replaceable supply items according to one example embodiment.

Referring now to the drawings and particularly to FIG. 1, there is shown a schematic depiction of an image forming device 10 according to one example embodiment. Image forming device 10 may include, for example, an electrophotographic printer (commonly referred to as a laser printer), which may include scanning, copying or faxing functionality. One or more supply items 100 are removably installed in image forming device 10 allowing a user to replace or repair supply items 100 as needed in order to continue printing. For example, FIG. 1 shows an access door 12 on image forming device 10 that opens to allow a user to install or remove supply items 100 from image forming device 10. In the example embodiment illustrated, each supply item 100 includes a reservoir 102 formed within a housing 104 of the supply item 100 for holding a supply of toner for use in print operations by image forming device 10. However, supply item 100 may include any component requiring periodic user replacement such as, for example, a fuser of an electrophotographic printer, a waste toner container that stores unused toner removed from a photoconductive drum or intermediate transfer member of an electrophotographic printer, etc.

Each supply item 100 includes a supply chip 110 mounted on housing 104 of the supply item 100. Supply chip 110 is electrically connected to electrical contacts on supply item 100 that are positioned to mate with corresponding electrical contacts in image forming device 10 when supply item 100 is installed in image forming device 10 in order to permit communication between supply chip 110 and a controller 20 of image forming device 10. For example, supply chip 110 of supply item 100 and controller 20 of image forming device 10 may exchange authentication or validation information in order to ensure that supply item 100 is authorized and suitable for use in image forming device 10. Supply chip 110 of supply item 100 and controller 20 of image forming device 10 may exchange operating or usage information such as an initial toner fill level, an indication of a toner color contained within reservoir 104, ongoing toner supply levels, consumption or usage rates, replacement schedules, or other information useful for the operation of supply item 100 in image forming device 10.

Figure 2:
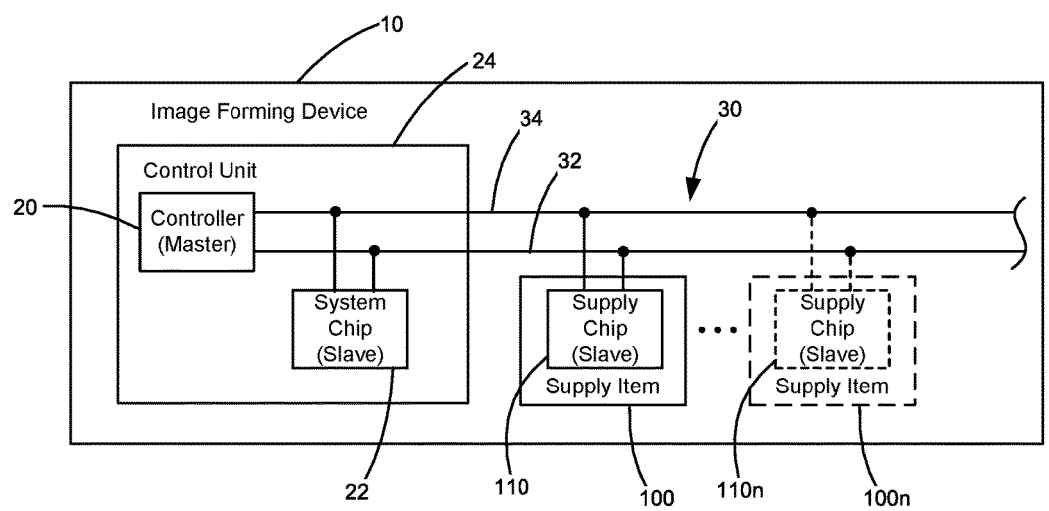
FIG. 2 is a block diagram depiction of the image forming device including a communication bus that permits communication between a controller of the image forming device and one or more supply chips according to one example embodiment.

FIG. 2 shows a communication bus 30 of image forming device 10 that facilitates communication between controller 20 and supply chips 110 according to one example embodiment. FIG. 2 shows one supply item 100 and associated supply chip 110 in solid line and an additional supply item 100n and associated supply chip 110n in broken line indicating that additional supply items 100 having supply chips 110 may be used as desired. In the example embodiment illustrated, communication bus 30 utilizes the Inter-Integrated Circuit (I2C) protocol; however, other communication protocols may be used as desired. Controller 20 is configured to serve as the master node of communication bus 30 with each supply chip 110 configured to serve as a respective slave node. In the example embodiment illustrated, a system chip 22 serves as an additional slave node of communication bus 30. In this embodiment, controller 20 and system chip 22 combine to form a control unit 24 of image forming device 10 that controls communication with supply chips 110. In one embodiment, system chip 22 facilitates encrypted communication between controller 20 and supply chips 110 where controller 20 and supply chips 110 are unable to directly interpret messages from each other for security purposes. For example, prior to sending an encrypted command to a supply chip 110, controller 20 may send the command to system chip 22 which may decrypt and re-encrypt the command according to a format that will be understood by supply chip 110 and return the re-encrypted command to controller 20 to be sent by controller 20 to supply chip 110. Similarly, upon receiving an encrypted response from a supply chip 110, controller 20 may send the response to system chip 22 which may decrypt and re-encrypt the response according to a format that will be understood by controller 20 and return the re-encrypted response to controller 20. System chip 22 may also aid controller 20 in the authentication and validation of supply chips 110.

In the example embodiment illustrated, communication bus 30 includes a bi-directional data line 32 that carries data back and forth between controller 20 and the slave nodes and a clock line 34 that carries clock signals from controller 20 to the slave nodes. Each slave node includes a respective address on communication bus 30 allowing controller 20 to direct communications to a particular slave node.

Controller 20, system chip 22 and supply chips 110 may each include a printed circuit board assembly having one or more processors and associated memory. The processor may include one or more integrated circuits in the form of a microprocessor or microcontroller. The memory may be any suitable combination of volatile and non-volatile memory such as, for example, random access memory (RAM), read only memory (ROM), read-write memory, flash memory, EEPROM and/or non-volatile RAM (NVRAM). For example, controller 20 may include non-volatile memory storing program instructions for issuing commands to the slave nodes and for receiving and processing responses from the slave nodes. Similarly, system chip 22 and supply chips 110 may each include non-volatile memory storing program instructions for receiving and processing commands from controller 20 and for responding to commands received from controller 20. It will also be appreciated that various aspects of controller 20, system chip 22 and supply chips 110 may be implemented in special purpose hardware by way of one or more application-specific integrated circuits (ASICs) such that the functions of controller 20, system chip 22 and supply chip(s) 110 may be carried out by hardware, software or a combination thereof.

Controller 20 as the master node is programmed to issue various write and read commands to the slave nodes over communication bus 30. For example, controller 20 may issue commands to request authentication or validation credentials from the slave nodes or to instruct the slave nodes to perform authentication or validation tests, to request toner capacity or usage information from supply chips 110 or to store toner usage information to supply chips 110, etc. In one embodiment, each write command issued by controller 20 is followed by a corresponding read command from controller 20. Controller 20 initiates write and read commands by sending a start condition over data line 32 of communication bus 30 that includes the address of the intended slave node and a read/write bit set to a value representing either a write command or a read command. After initializing a write command, controller 20 sends a data packet associated with the write command to the receiving slave node. After initializing a read command, controller 20 sends clock pulses on clock line 34 to the receiving slave node. The slave nodes are programmed to receive and process write commands from controller 20 and to send a response to controller 20 upon receiving the corresponding read command.

Commands and responses sent over communication bus 30 by the master node and the slave nodes adhere to a particular data packet format allowing the commands and responses to be understood by the receiving master node or slave node. For example, in one embodiment, each data packet includes a header that includes an indication of the length of the data being transmitted, an encryption bit that indicates whether or not the command or response is encrypted and a transmission cycle bit that is toggled for each new write command sent by controller 20 as discussed in greater detail below. Each write command transmitted by the master node also includes a Command ID and each response transmitted by a slave node includes a Response ID that allows the receiving slave node or master node to identify the particular command or response being transmitted. Each data packet also includes the data being transmitted in the body of the data packet. In one embodiment, each data packet also includes a cyclic redundancy check (CRC) value allowing the receiving master node or slave node to check the accuracy of the data transmitted as is known in the art.

Figure 3:
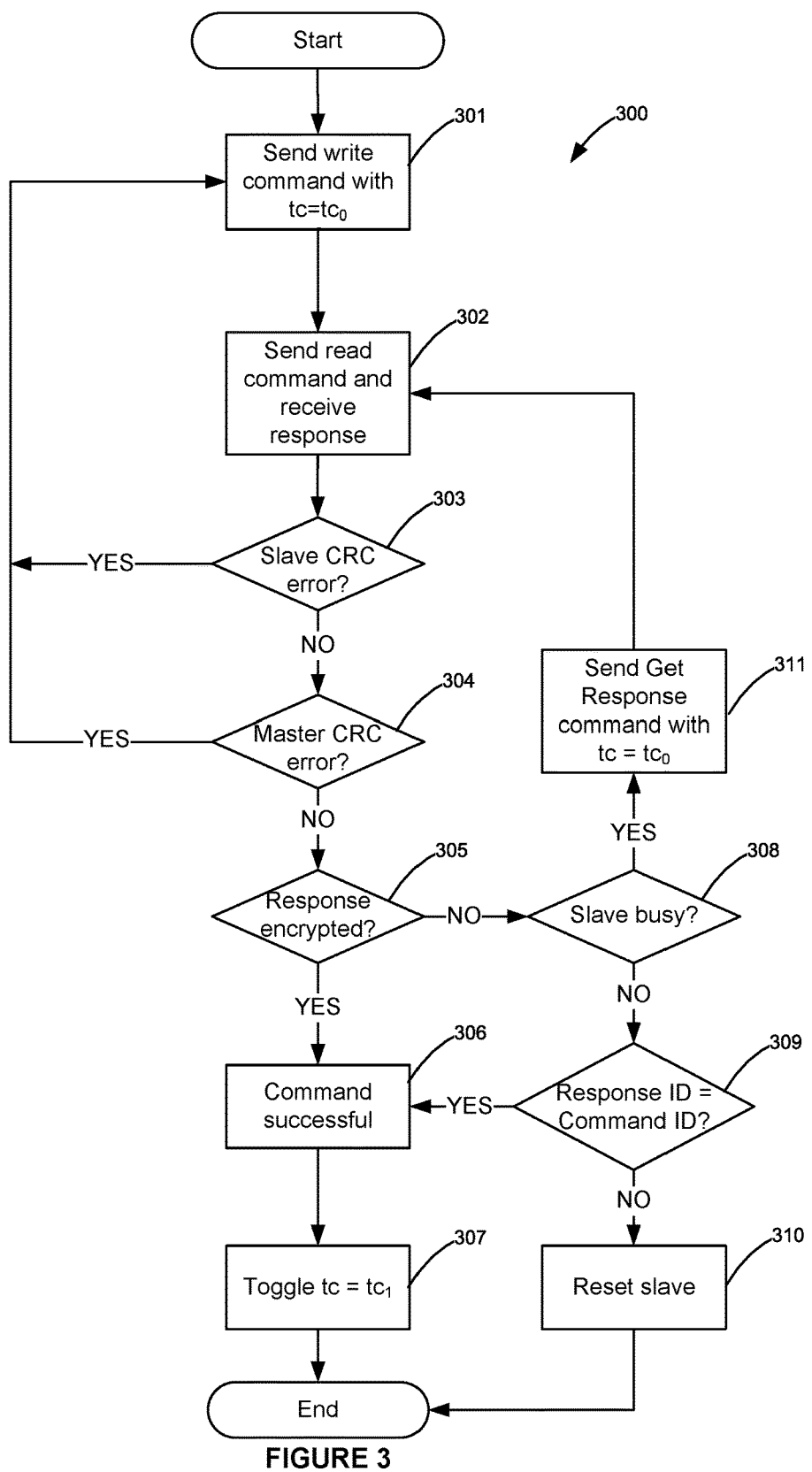
FIG. 3 is a flowchart illustrating a method of issuing commands from the controller of the image forming device to a supply chip according to one example embodiment.

FIG. 3 illustrates a method 300 of issuing commands from controller 20 as the master node to supply chip 110 as the slave node according to one example embodiment. At step 301, controller 20 sends a write command over data line 32 of communication bus 30 to supply chip 110 with the transmission cycle bit (tc) at an initial value ($tc_0$). At step 302, controller 20 sends a read command over data line 32 of communication bus 30 to supply chip 110 and receives a response over data line 32 of communication bus 30 from supply chip 110. At step 303, controller 20 determines whether the response from supply chip 110 indicates that supply chip 110 calculated a CRC error indicating that an error occurred in the transmission of the write command from controller 20 to supply chip 110. If the response from supply chip 110 indicates that supply chip 110 calculated a CRC error, controller 20 resends the write command to supply chip 110 at step 301 with the transmission cycle bit (tc) at the initial value ($tc_0$) and sends a read command to supply chip 110 and receives a response from supply chip 110 at step 302. Resending the write command to supply chip 110 with the transmission cycle bit (tc) at the initial value ($tc_0$) signals to supply chip 110 that the write command received is a repeat of the preceding write command rather than a new write command. If the response from supply chip 110 indicates that supply chip 110 did not calculate a CRC error, controller 20 determines whether a CRC error is present in the response received from supply chip 110 at step 304 indicating that an error occurred in the transmission of the response from supply chip 110 to controller 20. If the controller 20 determines that a CRC error is present in the response, controller 20 resends the write command to supply chip 110 at step 301 with the transmission cycle bit (tc) at the initial value ($tc_0$) and sends a read command to supply chip 110 and receives a response from supply chip 110 at step 302. Again, resending the write command to supply chip 110 with the transmission cycle bit (tc) at the initial value ($tc_0$) signals to supply chip 110 that the write command received is a repeat of the preceding write command rather than a new write command.

If controller 20 determines that no CRC error is present in the response, controller 20 determines whether the response from supply chip 110 is encrypted at step 305. If the response from supply chip 110 is encrypted, controller 20 determines that the command was successful at step 306 and toggles the transmission cycle bit (tc) from the initial state ($tc_0$) to an opposite state ($tc_1$), i.e., controller 20 toggles the transmission cycle bit (tc) from a binary zero state to a binary one state or vice versa, at step 307. Toggling the transmission cycle bit (tc) at step 307 allows the next write command sent by controller 20 to include the transmission cycle bit at an initial value that is opposite the initial value ($tc_0$) of the write command sent by controller 20 at step 301. In this manner, the transmission cycle bit (tc) toggles back and forth between a binary zero state and a binary one state each time a new write command is sent signaling to supply chip 110 that the write command received is a new write command to be executed.

If the response from supply chip 110 is not encrypted, controller 20 determines whether the response from supply chip 110 indicates that supply chip 110 is busy at step 308 indicating that controller 20 sent the read command at step 302 before supply chip 110 finished executing the write command sent at step 301. If the response from supply chip 110 indicates that supply chip 110 is not busy, at step 309, controller 20 compares a Command ID value of the write command sent at step 301 with a Response ID value of the response received at step 302. If the Command ID value and the Response ID value match indicating that the response received by controller 20 from supply chip 110 is responsive to the write command issued by controller 20, controller 20 determines that the command was successful at step 306 and toggles the transmission cycle bit (tc) from the initial state ($tc_0$) to an opposite state ($tc_1$) at step 307. If the Command ID value and the Response ID value do not match indicating that the response received by controller 20 from supply chip 110 is not responsive to the write command issued by controller 20, controller 20 resets supply chip 110 at step 310 in order to attempt to resolve the error.

In one embodiment, if the response from supply chip 110 indicates that supply chip 110 is busy at step 308, controller 20 sends a "Get Response" command over data line 32 of communication bus 30 to supply chip 110 with the transmission cycle bit (tc) at the initial value ($tc_0$). In the example embodiment illustrated, the Get Response command is a special purpose command used only after a busy response is received from supply chip 110. The Get Response command instructs supply chip 110 to provide a response to the last write command (other than any preceding Get Response commands) received by supply chip 110. This allows controller 20 to continually poll supply chip 110 for a response while supply chip 110 continues to execute the write command sent at step 301 so that a response may be sent by supply chip 110 once supply chip 110 finishes executing the write command and is no longer in a busy state. The Get Response command allows controller 20 to continually request a response from supply chip 110 without having to resend the full write command each time. The Get Response command includes a smaller data packet and, in this manner, is abbreviated with respected to other write commands sent by controller 20 to supply chip 110. As a result, sending a Get Response command is typically more efficient than resending the original write command.

Figure 4:
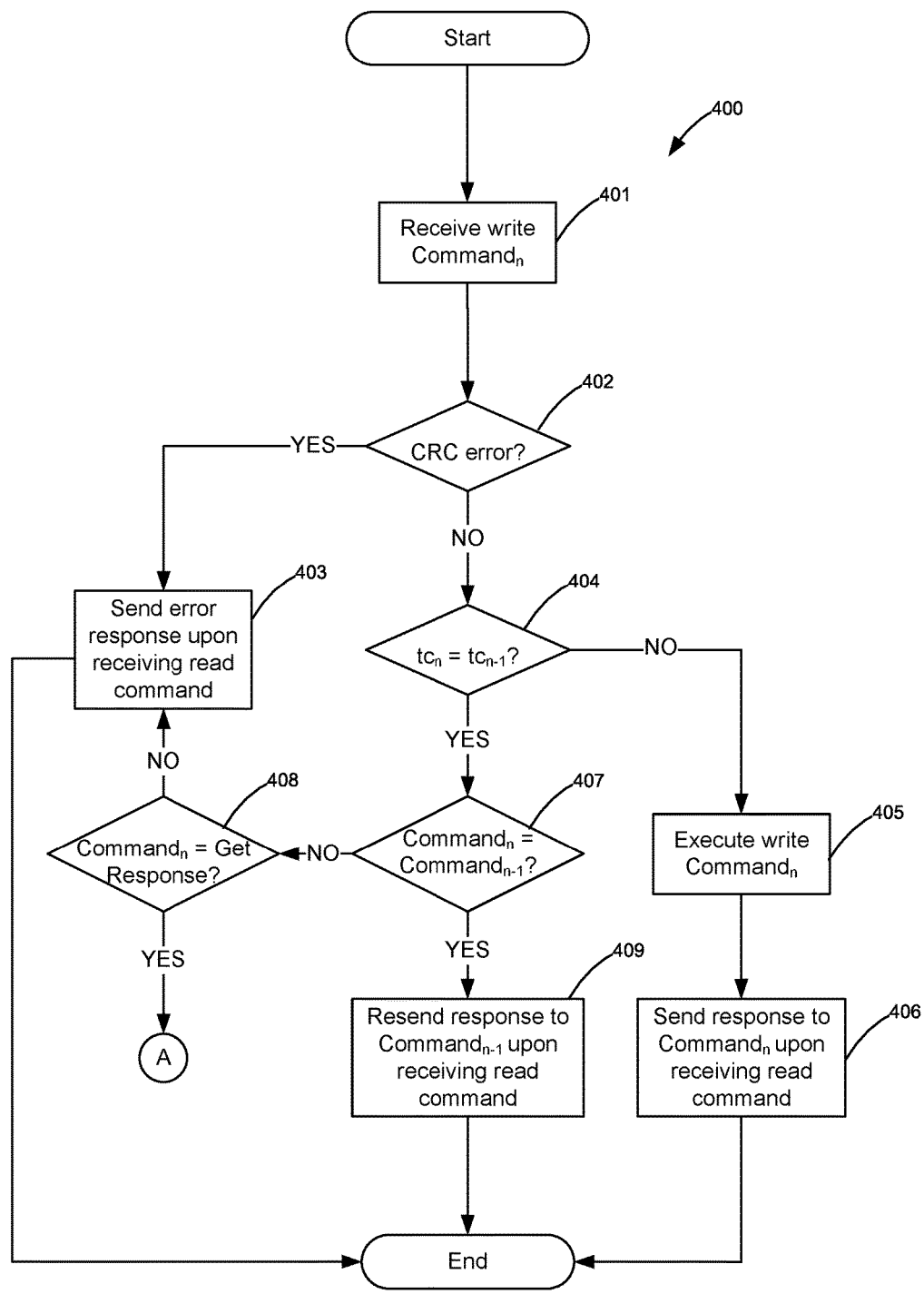
FIG. 4 is a flowchart illustrating a method of processing and responding to commands received by the supply chip from the controller according to one example embodiment.

FIG. 4 illustrates a method 400 of processing and responding to commands received by supply chip 110 as the slave node from controller 20 as the master node according to one example embodiment. At step 401, supply chip 110 receives a write command ($Command_n$) from controller 20 over data line 32 of communication bus 30. At step 402, supply chip 110 determines whether a CRC error is present indicating that an error occurred in the transmission of the write command from controller 20 to supply chip 110. If supply chip 110 calculates a CRC error at step 402, upon receiving a read command over data line 32 of communication bus 30 corresponding to the write command ($Command_n$) received at step 401, supply chip 110 sends an error response over data line 32 of communication bus 30 to controller 20 at step 403 indicating that supply chip 110 calculated a CRC error. If supply chip 110 does not calculate a CRC error at step 402, supply chip 110 determines at step 404 whether the value of the transmission cycle bit ($tc_n$) contained in the write command ($Command_n$) received at step 401 is the same as the value of the transmission cycle bit ($tc_{n-1}$) contained in the preceding write command ($Command_{n-1}$) received by supply chip 110. If supply chip 110 determines that the transmission cycle bit ($tc_n$) of the write command ($Command_n$) received at step 401 is not equal to the transmission cycle bit ($tc_{n-1}$) of the preceding write command ($Command_{n-1}$) received by supply chip 110 indicating that the write command ($Command_n$) received at step 401 is a new write command to be executed, at step 405, supply chip 110 executes the write command ($Command_n$) received at step 401. At step 406, upon receiving a read command corresponding to the write command ($Command_n$) received at step 401, supply chip 110 sends a response over data line 32 of communication bus 30 indicating the completion of the write command ($Command_n$) received at step 401.

If, on the other hand, supply chip 110 determines that the transmission cycle bit ($tc_n$) of the write command ($Command_n$) received at step 401 is equal to the transmission cycle bit ($tc_{n-1}$) of the preceding write command ($Command_{n-1}$) received by supply chip 110, supply chip 110 determines at step 407 whether the Command ID value contained in the write command ($Command_n$) received at step 401 is the same as the Command ID value contained in the preceding write command ($Command_{n-1}$) received by supply chip 110. If supply chip 110 determines that the Command ID of the write command ($Command_n$) received at step 401 is not equal to the Command ID of the preceding write command ($Command_{n-1}$) received by supply chip 110, in the example embodiment illustrated, supply chip determines at step 408 whether the Command ID value contained in the write command ($Command_n$) received at step 401 indicates that the write command ($Command_n$) is a Get Response command sent by controller 20 following a busy response from supply chip 110 as discussed above. If supply chip 110 determines that the write command ($Command_n$) is a Get Response command, supply chip 110 proceeds to the method 500 illustrated in FIG. 5 until the busy condition is resolved as discussed in greater detail below. If supply chip 110 determines that the write command ($Command_n$) is not a Get Response command, upon receiving a read command corresponding to the write command ($Command_n$) received at step 401, supply chip 110 sends an error response to controller 20 over data line 32 of communication bus 30 at step 403 due to the Command ID inconsistency.

If supply chip 110 determines that the Command ID of the write command (Command$_n$) received at step 401 is equal to the Command ID of the preceding write command (Command$_{n-1}$) received by supply chip 110, supply chip 110 does not execute the write command (Command$_n$) received at step 401 but instead, upon receiving a read command corresponding to the write command (Command$_n$) received at step 401, supply chip 110 simply resends the response to the preceding write command (Command$_{n-1}$) to controller 20 over data line 32 of communication bus 30 at step 409. In this manner, the transmission cycle bit signals to supply chip 110 whether the write command (Command$_n$) received at step 401 is a new write command to be executed or a repeat of the preceding write command (Command$_{n-1}$). The recognition by supply chip 110 that the write command (Command$_n$) received at step 401 is a repeat of the preceding write command (Command$_{n-1}$) improves the efficiency of supply chip 110 by allowing supply chip 110 to simply resend the response to the preceding write command (Command$_{n-1}$) without executing the write command (Command$_n$) again. The recognition by supply chip 110 that the write command (Command$_n$) received at step 401 is a repeat of the preceding write command (Command$_{n-1}$) also prevents possible errors that could occur if supply chip 110 were to execute the write commands (Command$_{n-1, n}$) twice instead of once as intended by controller 20.

If at any point after the receipt of the write command (Command$_n$) at step 401 supply chip 110 receives the corresponding read command before supply chip 110 has completed processing the write command (Command$_n$), for example, prior to or during the execution of steps 402, 404, 405, 407 or 408, supply chip 110 may send a busy response to controller 20 over data line 32 of communication bus 30. As discussed above, the receipt of a busy response from supply chip 110 may cause controller 20 to send a Get Response command to supply chip 110.

Figure 5:
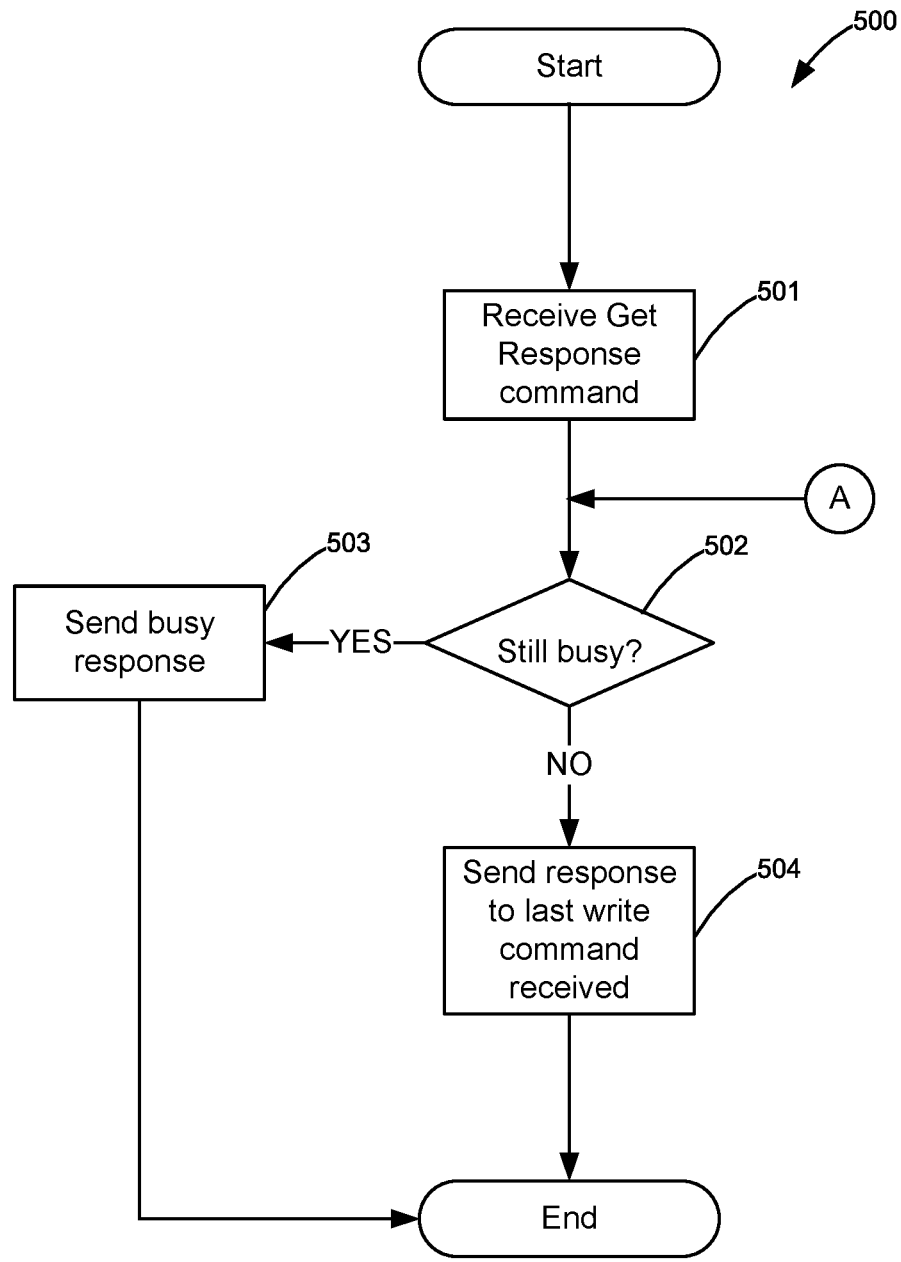
FIG. 5 is a flowchart illustrating a method of processing and responding to commands received by the supply chip from the controller upon the occurrence of a busy condition according to one example embodiment.

FIG. 5 illustrates a method 500 of processing and responding to commands received by supply chip 110 as the slave node from controller 20 as the master node after supply chip 110 issues a busy response to controller 20 according to one example embodiment. At step 501, after previously sending a busy response to controller 20, supply chip 110 receives a Get Response command from controller 20 over data line 32 of communication bus 30. If supply chip 110 is still busy processing the most recent write command (preceding the one or more Get Response commands received) upon receiving a read command from controller 20 corresponding to the Get Response command at step 502, supply chip 110 again sends a busy response to controller 20 over data line 32 of communication bus 30 at step 503. Supply chip 110 may continue to receive additional Get Response commands and send busy responses until supply chip finishes processing the most recent write command from controller 20. Once supply chip 110 completes processing the most recent write command at step 502, upon receiving a read command from controller 20, supply chip 110 sends a response to the most recent write command received from controller 20. In this manner, the Get Response command accounts for the occurrence of a busy condition of supply chip 110 allowing controller 20 to continually request a response from supply chip 110 without having to resend the full write command each time.

While the example embodiments discussed above with respect to FIG. 3 includes the issuing of commands from controller 20 as the master node to supply chip 110 as the slave node, the commands discussed in FIG. 3 may instead to be issued by controller 20 as the master node to system chip 22 as the slave node. Similarly, while the example embodiments discussed above with respect to FIGS. 4 and 5 include the processing and responding to commands received by supply chip 110 as the slave node from controller 20 as the master node, the commands discussed in FIGS. 4 and 5 may instead be received and processed by system chip 22 as the slave node from controller 20 as the master node.

The example embodiment discussed above include communications between a controller 20 of an electrophotographic image forming device 10 and a supply chip 110 of a supply item 100 installed in image forming device 10. The electrophotographic printing process is well known in the art and, therefore, is described briefly herein. During a print operation, a charge roll charges the surface of a photoconductive drum. The charged surface of the photoconductive drum is then selectively exposed to a laser light source to form an electrostatic latent image on the photoconductive drum corresponding to the image being printed. Charged toner from a toner reservoir is transferred by a developer roll to the latent image on the photoconductive drum creating a toned image. The toned image is then transferred from the photoconductive drum to the print media either directly by the photoconductive drum or indirectly by an intermediate transfer member. A fusing unit fuses the toner to the print media. A cleaning blade (or cleaning roll) removes any residual toner adhering to the photoconductive drum after the toner is transferred to the print media. The cleaned surface of the photoconductive drum is then ready to be charged again and exposed to the laser light source to continue the printing cycle.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner container installable in an image forming device having a controller, comprising:
   a housing having a reservoir for storing toner; and
   a chip positioned on the housing and configured to receive a first write command from the controller of the image forming device, the chip further configured to send a first busy response to the controller of the image forming device upon receiving a first read command from the controller of the image forming device corresponding to the first write command while processing the first write command, the chip further configured to, after sending the first busy response, receive a second write command from the controller of the image forming device that is abbreviated relative to the first write command and that requests the chip to send a response to the first write command, the chip further configured to send a response to the first write command to the controller of the image forming device if upon receiving a second read command corresponding to the second write command the chip has completed processing the first write command, and the chip further configured to send a second busy response to the controller of the image forming device if upon receiving the second read command the chip has not completed processing the first write command.

2. A chip configured for communication with a controller of an image forming device and mountable on a replaceable supply item for installation in the image forming device, comprising a processor and a memory; the memory storing program instructions for execution by the processor including instructions to receive a first write command from the controller of the image forming device, to send a first busy response to the controller of the image forming device upon receiving a first read command from the controller of the image forming device corresponding to the first write command while processing the first write command, to, after sending the first busy response, receive a second write command from the controller of the image forming device that is abbreviated relative to the first write command and that requests the chip to send a response to the first write command, to send a response to the first write command to the controller of the image forming device if upon receiving a second read command corresponding to the second write command the processor has completed processing the first write command, and to send a second busy response to the controller of the image forming device if upon receiving the second read command the processor has not completed processing the first write command.

3. A chip for use on a replaceable supply item of an image forming device, comprising processing circuitry configured to communicate as a slave node of an I2C communication bus with a controller of the image forming device as a master node of the I2C communication bus, the processing circuitry configured to, after sending a first busy response to the controller of the image forming device while processing a first write command received from the controller of the image forming device, receive a second write command from the controller of the image forming device that has less data than the first write command and that requests the chip on the replaceable supply item to send a response to the first write command, the processing circuitry configured to send a response to the first write command to the controller of the image forming device if upon receiving a read command corresponding to the second write command the processing circuitry is no longer processing the first write command,
further comprising the processing circuitry configured to send a second busy response to the controller of the image forming device if upon receiving the read command corresponding to the second write command the processing circuitry is still processing the first write command.

4. A method of processing commands from a controller of an image forming device by a chip on a replaceable supply item installed in the image forming device, comprising:
after sending a first busy response by the chip on the replaceable supply item to the controller of the image forming device while processing a first write command received by the chip on the replaceable supply item from the controller of the image forming device, receiving a second write command by the chip on the replaceable supply item from the controller of the image forming device that has less data than the first write command and that requests the chip on the replaceable supply item to send a response to the first write command; and
if upon receiving a read command corresponding to the second write command the chip on the replaceable supply item is no longer processing the first write command, sending a response to the first write command by the chip on the replaceable supply item to the controller of the image forming device,
further comprising if upon receiving the read command corresponding to the second write command the chip on the replaceable supply item is still processing the first write command, sending a second busy response by the chip on the replaceable supply item to the controller of the image forming device.

5. A method of electrical communication between a slave node of an I2C communication bus positioned on a replaceable supply item installed in an image forming device and a controller of the image forming device as a master node of the I2C communication bus, comprising:
receiving a first write command by the slave node on the replaceable supply item from the controller of the image forming device;
upon receiving a first read command by the slave node on the replaceable supply item from the controller of the image forming device corresponding to the first write command while processing the first write command, sending a first busy response by the slave node on the replaceable supply item to the controller of the image forming device;
after sending the first busy response, receiving a second write command by the slave node on the replaceable supply item from the controller of the image forming device that is abbreviated relative to the first write command and that requests the slave node on the replaceable supply item to send a response to the first write command;
if upon receiving a second read command corresponding to the second write command the slave node on the replaceable supply item has completed processing the first write command, sending a response to the first write command by the slave node on the replaceable supply item to the controller of the image forming device; and
otherwise, sending a second busy response by the slave node on the replaceable supply item to the controller of the image forming device.

6. A method of facilitating electrical communication between a controller of an image forming device and a chip for use on a replaceable supply item of the image forming device, comprising:
configuring the chip to operate as a slave node on an I2C communication bus where the controller of the image forming device serves as a master node on the I2C communication bus; and
configuring the chip to receive a first write command from the controller of the image forming device, to send a first busy response to the controller of the image forming device upon receiving a first read command from the controller of the image forming device corresponding to the first write command while processing the first write command, to, after sending the first busy response, receive a second write command from the controller of the image forming device that is abbreviated relative to the first write command and that requests the chip to send a response to the first write command, to send a response to the first write command to the controller of the image forming device if upon receiving a second read command corresponding to the second write command the chip has completed processing the first write command, and to send a second busy response to the controller of the image forming device if upon receiving the second read command the chip has not completed processing the first write command.

\* \* \* \* \*